United States Patent
Peyrot

[15] 3,702,389
[45] Nov. 7, 1972

[54] WELDING BY ELECTRON BOMBARDMENT

[72] Inventor: Jean-Pierre Peyrot, 1, place de la Division Leclerc, Villejuif, France

[22] Filed: Aug. 3, 1970

[21] Appl. No.: 60,534

[52] U.S. Cl. .................................. 219/121 EB
[51] Int. Cl. ........................................ B23k 15/00
[58] Field of Search ..... 219/121 EM, 121 R, 121 EB, 219/69, 137, 171 P

[56] References Cited

UNITED STATES PATENTS

| | | |
|---|---|---|
| 3,543,286 | 11/1970 | Stentz et al. .......... 219/121 EB |
| 3,610,876 | 10/1971 | Bhat ........................ 219/137 |
| 3,417,223 | 12/1968 | Steigerwald ........ 219/121 EM |
| 3,165,619 | 1/1965 | Cohen ................. 219/121 EB |
| 3,219,792 | 11/1965 | Pederson .................... 219/121 |
| 3,435,185 | 3/1969 | Gerard ....................... 219/121 |
| 3,424,891 | 1/1969 | Anderson et al. ......... 219/121 |
| 3,265,801 | 8/1969 | Eaton ....................... 219/121 |

*Primary Examiner*—J. V. Truhe
*Assistant Examiner*—Gale R. Peterson
*Attorney*—Karl W. Flocks

[57] ABSTRACT

Electron beam welding apparatus wherein means are provided for welding a joint sealed by a sheet of foil and thereafter depositing a plastic product on the weld head to prevent contamination.

5 Claims, 8 Drawing Figures

WELDING BY ELECTRON BOMBARDMENT

The present invention relates to the welding by electronic bombardment of metal parts of large dimensions, without it being necessary to house these parts in vacuum chambers of large capacity in order to carry out this operation. The invention relates especially to a device utilizing a vacuum chamber of small volume around at least one electronic gun, and a static cover, for example a metal foil of very small thickness placed in a fluid-tight manner above the edges to be welded, on which cover the vacuum chamber is arranged to slide. This cover is pierced in the interior of the vacuum chamber by the beam of electrons during the welding operation.

The invention has also for its object:

to permit a device of this kind to weld on flat or curved, horizontal, inclined or vertical surfaces along a straight, circular or any other path, closed or not closed, with or without filler metal;

a device for welding by electronic bombardment, in which an intermediate band of foil is traversed by the welding beam or beams, the said intermediate sheet being placed in a fluid-tight manner on the two parts to be welded. This sheet is provided with a hole located under the bell, so that the volume to be put under vacuum is limited by the bell, the joint to be welded and the foil which serves as a cover. The volume to be put under vacuum is thus reduced to the volume of the bell and to that formed by the clearance between the plates to be welded, together with the clearance between the foil and the upper faces of the plates;

a sliding fluid-tight joint which ensures the fluid-tightness of the bell solely on the foil if it is larger than the sliding joint, or simultaneously on the foil and the plates to be welded if it is less wide than the sliding joint;

an intermediate sheet of foil of this kind, which in certain cases adds to the weld a metallurgical additive element;

a sheet of foil of this kind which may be eliminated in the case of welding without filler metal (if its melting results in undesirable occlusions in the welding bead) and may be replaced by a TIG or other welding seam with very slight penetration. In this case, the volume to be put under vacuum is reduced to that of the bell. The putting under vacuum of the space formed by the clearance between the plates to be welded is effected by the extremities of the plates;

an installation of this kind which makes it possible to weld for example two plates brought close together, without however having perfect roller tracks, since a joint follower device permits the beam to be always held on the joint to be welded during the welding operation.

Other characteristic features and advantages will be brought out in the description which follows below, made with reference to the accompanying drawings, and giving purely by way of indication and not in any limitative sense, one form of embodiment of the invention.

Figures 1, 2:
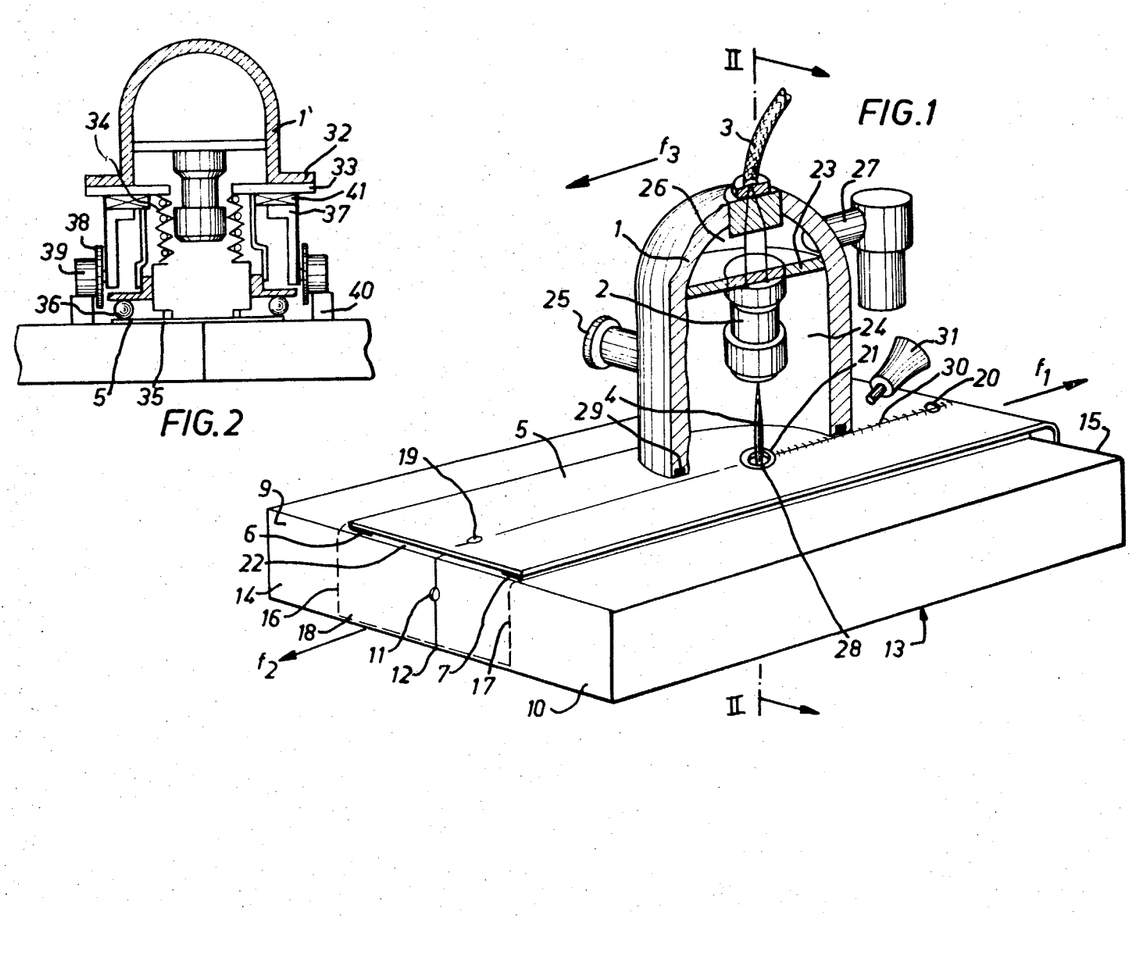
FIG. 1 is a diagram in perspective of a linear welding installation without filler metal, according to the invention.
FIG. 2 is a diagrammatic view in cross-section taken along the line II—II of FIG. 1.

In FIG. 1 there is shown a bell 1, inside which an electron gun 2 fed through a cable 3 projects its welding beam 4 through a sheet of foil 5 placed in a fluid-tight manner at 6 and 7 along the edges of the foil against the plates 9 and 10 to be welded to each other at 11. Fluid-tightness at 12 on the rear faces 13 of the plates is effected in a conventional manner.

Fluid-tightness on the extremities 14 and 15 of the plates to be welded is ensured along the edges 16, 17 and 18 of the foil in the same manner as on the edges 6 and 7 of the foil on the upper faces of the plates. The foil is provided with two holes 19 and 20 which enable it to be aligned visually along the joint 11 to be welded. These holes are subsequently plugged before pumping. This enables the edges of the foil to be kept parallel to the joint to be welded.

The foil is provided at one of its extremities with another hole 21 which is not plugged and which permits, through the intermediary of the bell, the creation of a vacuum inside the space 11 of the joint to be welded and the space 22 comprised between the foil and the faces of the plates to be welded.

It can be seen that the bell 1 is divided into two compartments by a partition 23, the compartment 24 in which a primary vacuum is established at the same time as in the spaces 11 and 22 by means of a pump connected to the orifice 25, and the compartment 26 in which there is permanently maintained a secondary vacuum by means of a device 27. In the compartment 26 is located the filament of the gun which is isolated by means of a valve at the level of the partition 23 when the primary vacuum of the compartment 24 is not established.

A primary pumping is also provided in the direction of the arrows f1 and f2 in order to create a vacuum in the spaces 11 and 22 if it happened that the pumping through the orifice 21 was not sufficient. This primary pumping in the directions f1 and f2 is essential in the case where the foil is replaced by TIG welding seam or other similar device.

It can be seen that the beam 4 pierces the foil at 28. When the bell 1 is moved in the direction of the arrow f3, the melting of the foil and the plates is effected (or of the plates when the foil is replaced by a TIG welding seam or other device) and the welding of the plates is effected.

Fluid-tightness between the bell 1 and the foil 5 is ensured by means of a peripheral joint 29 fixed on the bottom of the bell in a fluid-tight manner. If the foil is less wide than the joints 29, this same joint ensures by sliding the fluid-tightness on the foil and the plates to be welded simultaneously, or on the plates to be welded when the foil is replaced by a TIG welding seam or other device.

Due to the expansion of the molten zone, the welding causes an excrescence of metal prejudicial to fluid-tightness at the place where the said joint 29 crosses the welding bead 30. A device shown in a diagrammatic manner at 31 fills up the parts immediately adjacent to the bead with a removable plastic product which polymerizes very quickly in the hot state.

FIG. 2 shows diagrammatically certain details of the method of mounting the bell 1 on an automatic equipment.

It can be seen that the bell 1' is provided with a flange 32 fixed in a conventional fluid-tight manner on a flange 33 coupled to an elastic passage 34 which ensures at 35 the fluid-tightness in contact with the foil 5 or in contact with the plates when the foil is replaced by a TIG welding seam for example. As the atmospheric pressure applies an excessive pressure force on the joint 35, the remainder of the force is absorbed (after sufficient compression of the joint to ensure fluid-tightness) by carrier balls 36 which roll on the plates.

The flange 33 is rigidly fixed to brackets 37 carrying the pivots 38 of rollers 39 which roll on rails 40 placed in position by means of magnets, suckers or any other means on the plates 9 and 10. A transverse slide 41 fixed on the brackets 37 and underneath the flange 33 enables the bell 1' and the gun 2 to be moved transversely to the rails 40, which are not necessarily parallel to the joint to be welded. This transverse displacement is controlled by a line-follower device which can, either if it is housed in the bell, follow the joint to be welded, or if it is fixed outside the bell, it can follow the edge of the foil which is parallel to the joint to be welded or a line drawn parallel to the joint to be welded when the foil is replaced by a TIG welding seam.

Figure 3:
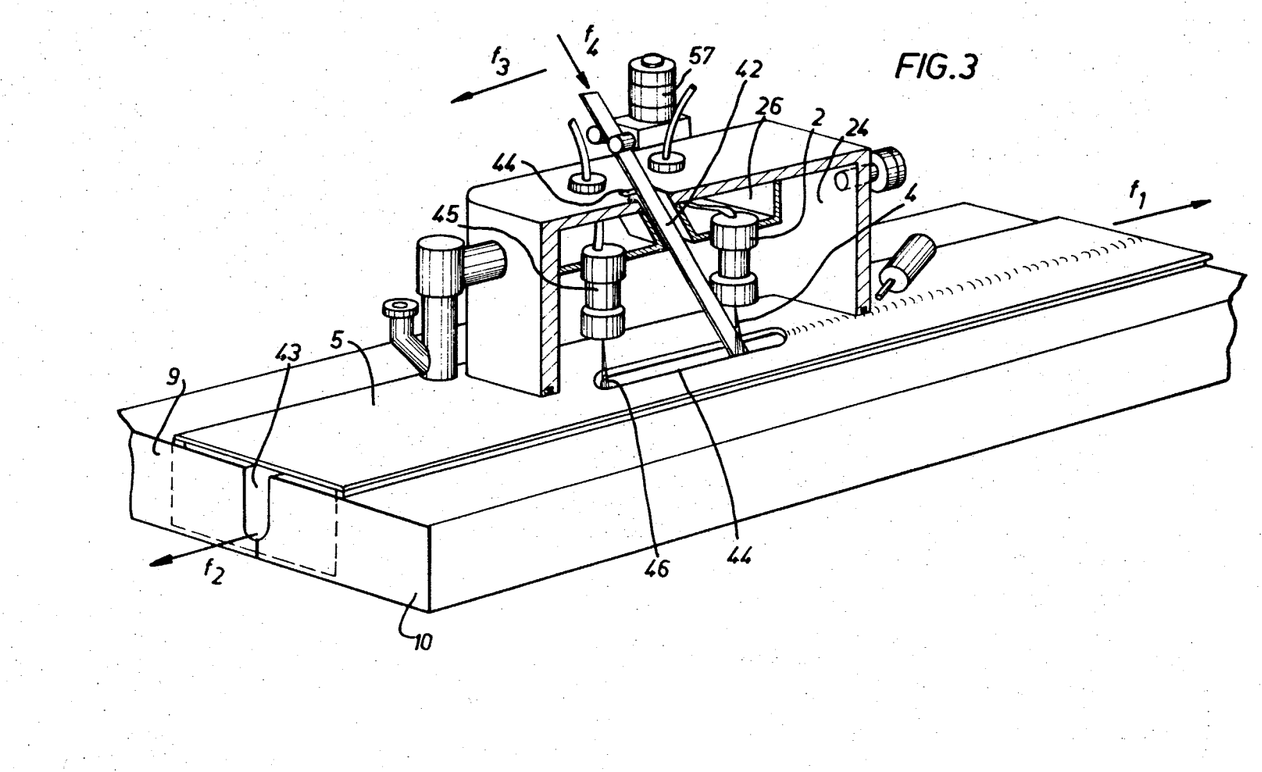
FIG. 3 is a diagram in perspective of a further installation for linear welding with filler metal, according to the invention.

FIG. 3 shows a welding installation with a filler metal 42. This installation is the same as that of FIG. 1 with the exception that the joint 43 to be welded between the plates 9 and 10 is larger than the joint 11 so as to permit filling with the filler metal. The pumping orifice 44 in the foil is oblong so as to permit the introduction of the filler metal 42, this latter being fed in a continuous manner in the direction of the arrow f4 underneath the beam 4 of the gun 2 where it is melted. The winding-off device 57 pushes the filler metal into the chamber 24 in the direction f4 and causes it to pass in at 44 in a fluid-tight manner, without passing into the chamber 26; the additional gun 45 pierces the foil 5 at 46 in order to retain the oblong shape of the orifice 44 during welding.

Figure 4:
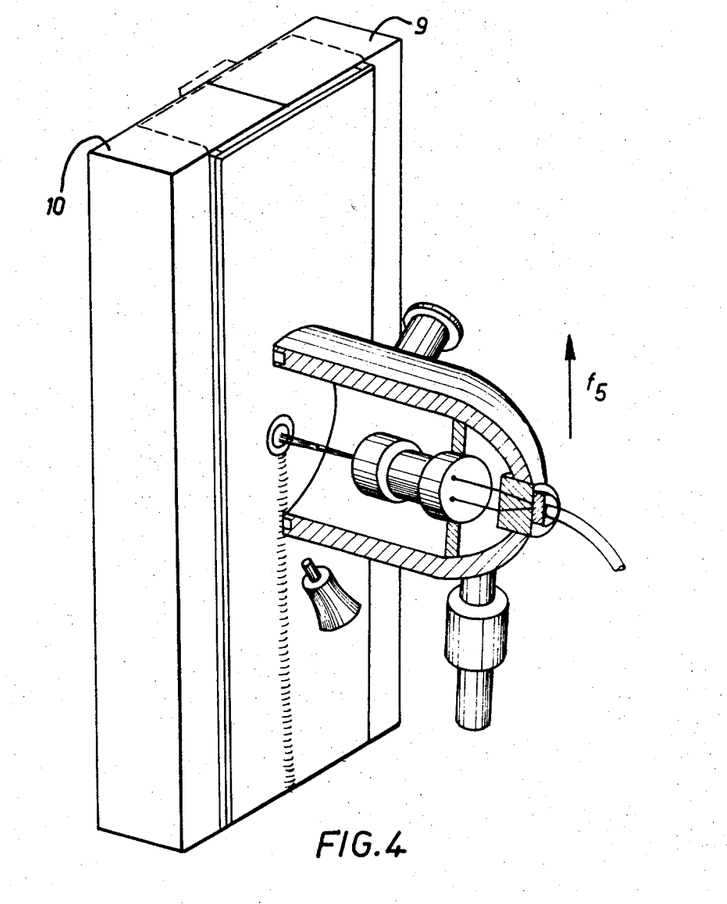
FIG. 4 is a perspective view similar to that of FIG. 3 of a welding operation on a vertical wall.

There is shown in FIG. 4 a welding installation without filler metal, permitting the welding of two plates 9 and 10 in the vertical position, following the direction of the arrow f5.

In this case also, the foil may be replaced by a TIG welding seam.

Figure 5:
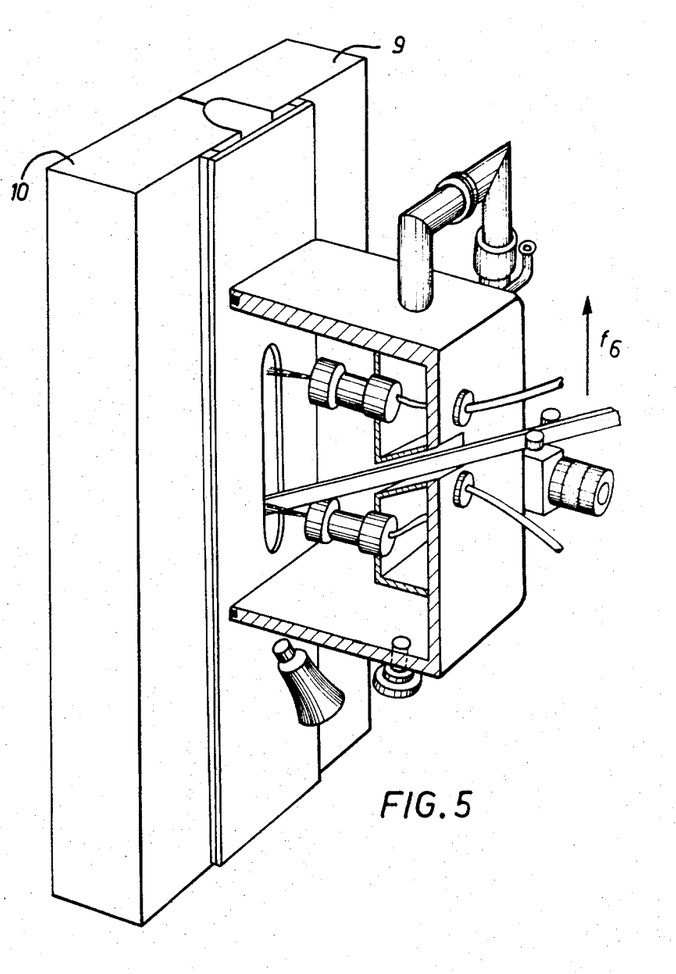
FIG. 5 is a perspective view similar to that of FIG. 3 of a welding operation carried out on a vertical wall.
Figure 6:
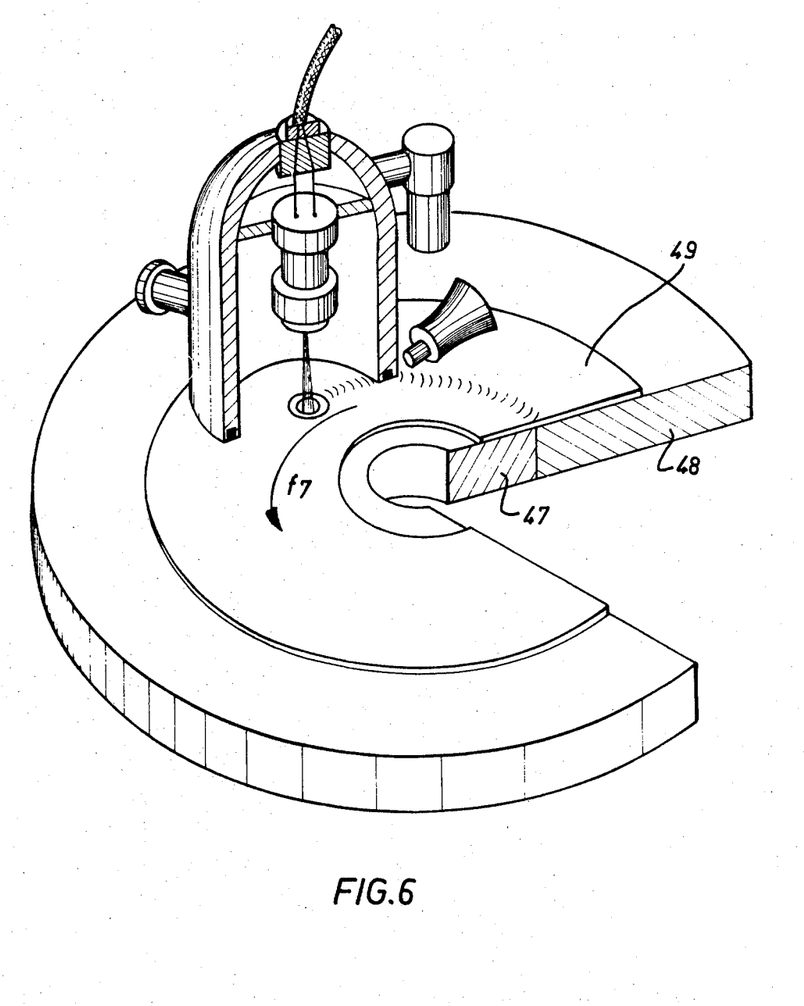
FIG. 6 is a view in perspective similar to that of FIG. 1, applied to circular welding.

There can be seen from FIG. 5 a welding installation with filler metal permitting the welding of two plates 9 and 10 following a vertical path in the direction of the arrow f6. There is shown in FIG. 6 a welding installation without filler metal by which it is possible to weld together, following the circular path in the direction f7, two plates 47 and 48 on which a circular foil is placed in a fluid-tight manner. This foil also may be replaced by a TIG welding seam.

Figure 7:
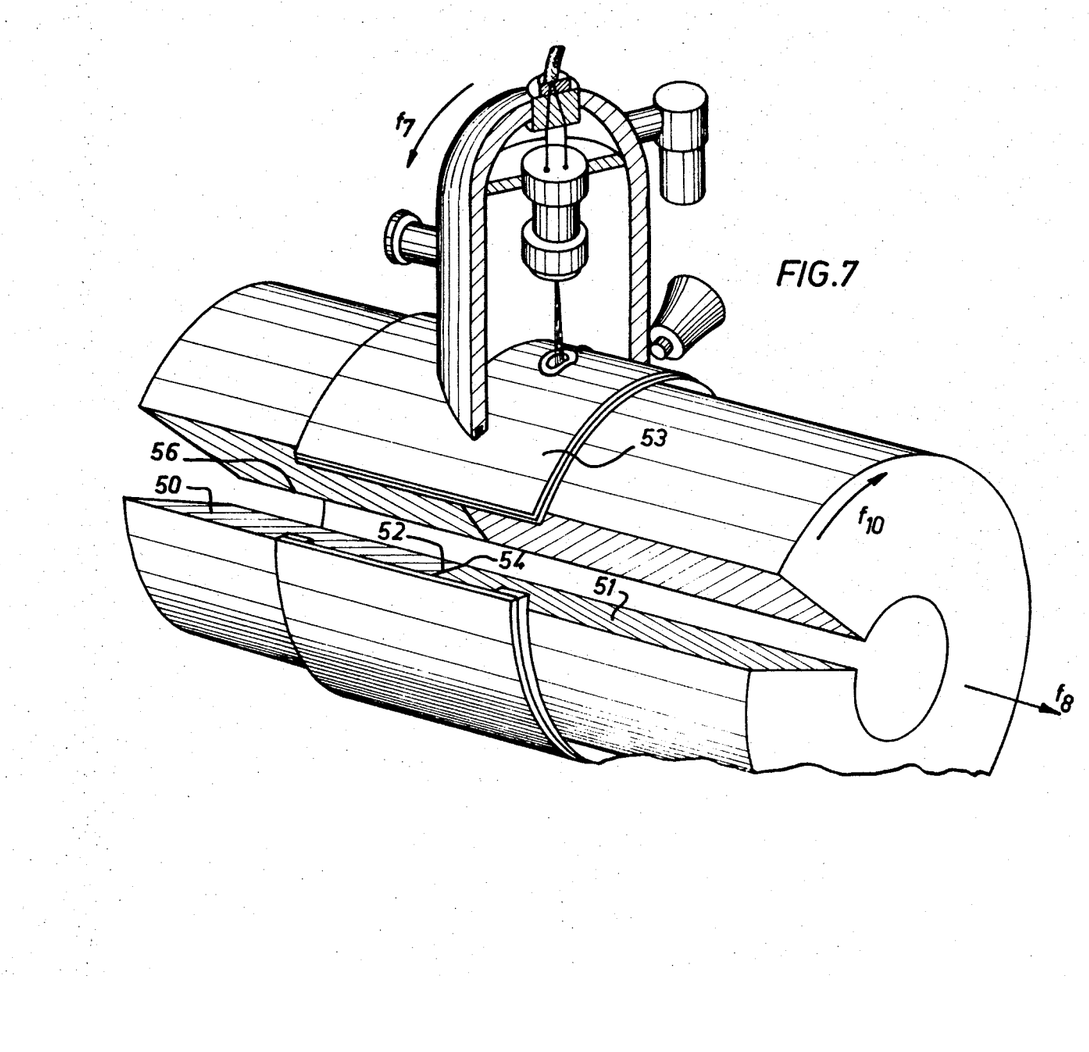
FIG. 7 is a perspective view of a welding installation for welding two cylinders without filler metal.

FIG. 7 shows a welding installation without filler metal permitting the welding of two cylinders 50 and 51. The joint 52 to be welded is covered by a cylindrical foil 53 which can be replaced by a TIG welding seam.

The rear portion 54 of the joint 52 to be welded is left as it is, and fluid-tightness is ensured by fluid-tight closure of the orifices 55 and 56 in the case where foil is employed. If so desired, additional pumping can be carried out in the direction f8 in the case where foil is used, but this pumping is essential in the case of replacement of the foil by a TIG welding seam for example. In the case of welding a body of revolution, either the bell rotates in the direction of the arrow f9 around the cylinders (the latter being fixed) or the cylinders rotate in the direction of the arrow f10 underneath the bell (this latter being fixed).

Figure 8:
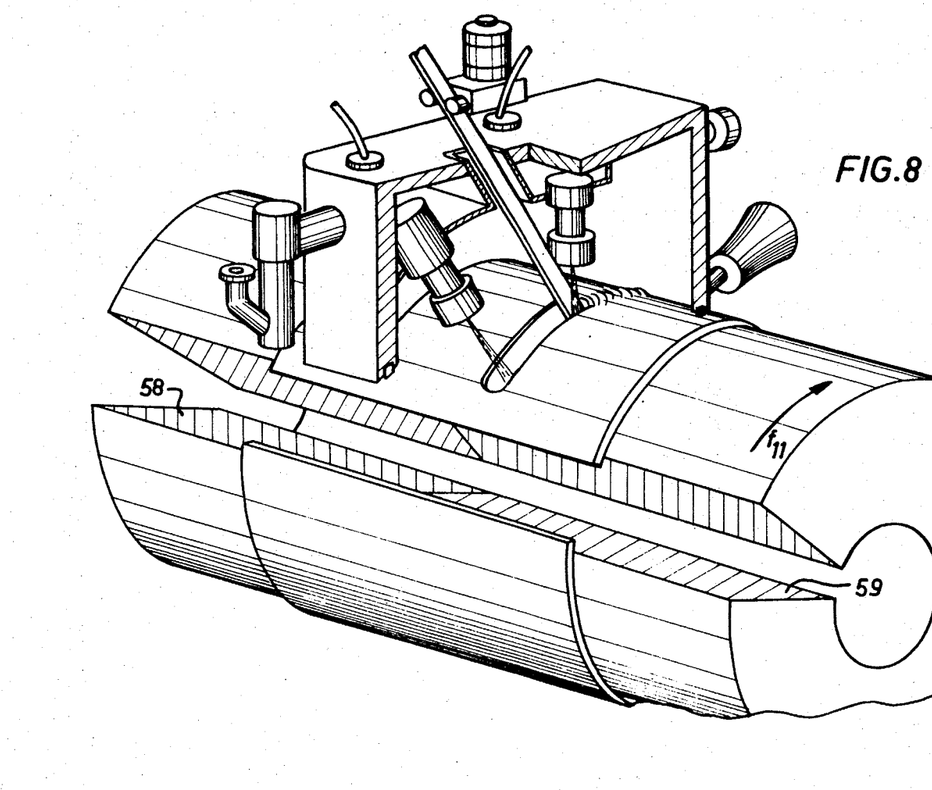
FIG. 8 is a perspective view of an installation for welding cylinders with a filler metal.

There is shown in FIG. 8 a welding installation with a filler metal, permitting the welding of two cylinders 58 and 59. In this case, the installation remains fixed above the cylinders and the cylinders rotate under the bell in the direction of revolution f11.

It will of course be understood that the present invention has been described above by way of indication of a preferred example but not in any limitative sense, and that any equivalence may be introduced into its constituent elements without thereby departing from its scope, as defined by the appended claims.

I claim:

1. A welding installation to weld sheets or plates along a joint comprising
    a vacuum bell positioned over the joint being welded,
    an electron gun in said bell,
    a fluid-tight seal along the edge of the opening of said bell to enable creation of a vacuum in said bell,
    a sheet of foil positioned in a fluid-tight manner on each side of the joint to be welded,
    and means to seal said vacuum in said bell with a plastic product deposited on the welding bead at the outlet of said bell.

2. The installation in accordance with claim 1, further characterized by
    said sheet of foil containing an additive element to be incorporated in the welding bead during welding.

3. A welding installation to weld with a filler material sheets or plates along a joint comprising
    a vacuum bell positioned over the joint being welded,
    first and second electron guns in said bell,
    a fluid-tight seal along the edge of the opening of said bell to enable creation of a vacuum under said bell,
    and a sheet of foil positioned in a fluid-tight manner on each side of the joint to be welded,
    said first gun having an electron beam means to pierce said foil to allow insertion of the filler material in the welding chamber and preheat the sheets or plates to be welded,
    said second gun having an electron beam means to melt the filler material in the welding chamfer.

4. The installation in accordance with claim 3, further characterized by
    means to seal the vacuum in said bell with a plastic product deposited on the welding bead at the outlet of said bell.

5. A welding installation to weld sheets or plates along a joint forming a welding bead thereon comprising a vacuum bell positioned over the joint being welded,
an electron gun in said bell,
a fluid-tight seal along the edge of the opening of said bell to enable creation of a vacuum in said bell,
a sheet of foil positioned in a fluid-tight manner on each side of the joint to be welded,
said electron gun having a beam passing through said sheet of foil during welding,
and means to seal the vacuum in said bell with a plastic product deposited on the welding bead at the outlet of said bell.

* * * * *